United States Patent [19]

Murphy

[11] Patent Number: 4,552,438
[45] Date of Patent: Nov. 12, 1985

[54] CABLE TENSIONED MEMBRANE SOLAR COLLECTOR MODULE WITH VARIABLE TENSION CONTROL

[75] Inventor: Lawrence M. Murphy, Lakewood, Colo.

[73] Assignee: The United States of America as represented by the United States Department of Energy, Washington, D.C.

[21] Appl. No.: 569,085

[22] Filed: Jan. 9, 1984

[51] Int. Cl.⁴ .......................... G02B 5/10; G02B 7/18; H01Q 19/12
[52] U.S. Cl. ................................... 350/608; 350/611; 343/914
[58] Field of Search ............... 350/608, 611; 343/914, 343/915; 353/3

[56] References Cited

U.S. PATENT DOCUMENTS

| | | | |
|---|---|---|---|
| 1,529,292 | 3/1925 | Benford | 350/608 |
| 3,635,547 | 1/1972 | Rushing et al. | 350/608 |
| 3,781,095 | 12/1973 | Rushing et al. | 350/608 |
| 3,843,238 | 10/1974 | Rushing et al. | 350/608 |
| 3,973,834 | 8/1976 | Penn et al. | 350/608 |
| 4,201,991 | 5/1980 | Vines | 343/915 |
| 4,209,236 | 6/1980 | Horton et al. | 350/608 |
| 4,226,507 | 10/1980 | Fuschetto | 350/611 |
| 4,251,135 | 2/1981 | Stone | 350/608 |

FOREIGN PATENT DOCUMENTS 501072 6/1930 Fed. Rep. of Germany ...... 350/608

OTHER PUBLICATIONS

Robert A. Luly, PCT/US81/00997, Feb. 18, 1982.

Primary Examiner—Jon W. Henry
Attorney, Agent, or Firm—Kenneth L. Richardson; John M. Albrecht; Judson R. Hightower

[57] ABSTRACT

Disclosed is a solar collector comprising a membrane for concentrating sunlight, a plurality of elongated structural members for suspending the membrane member thereon, and a plurality of control members for adjustably tensioning the membrane member, as well as for controlling a focus produced by the membrane members. Each control member is disposed at a different corresponding one of the plurality of structural members. The collector also comprises an elongated flexible tensioning member, which serves to stretch the membrane member and to thereafter hold it in tension, and a plurality of sleeve members, which serve to provide the membrane member with a desired surface contour during tensioning of the membrane member. The tensioning member is coupled to the structural members such that the tensioning member is adjustably tensioned through the structural members. The tensioning member is also coupled to the membrane member through the sleeve members such that the sleeve members uniformly and symmetrically stretch the membrane member upon applying tension to the tensioning member with the control members.

13 Claims, 9 Drawing Figures

CABLE TENSIONED MEMBRANE SOLAR COLLECTOR MODULE WITH VARIABLE TENSION CONTROL

CONTRACTUAL ORIGIN OF THE INVENTION

The United States Government has rights in this invention pursuant to Contract No. DE-AC02-83CH10093 between the United States Department of Energy and the Midwest Research Institute.

BACKGROUND OF THE INVENTION

1. Field of the Invention

The present invention relates generally to solar collectors and, more particularly, to a cable-tensioned membrane solar collector module with variable tension control.

2. Description of the Prior Art

Recent developments in the solar heliostat collector art include a trend toward manufacturing reflector panels or modules for concentrating heliostat collector assemblies with thin, flexible, lightweight, reflector materials. Examples of such reflector materials are thin metallic sheets of steel or aluminum, which are often called foils. Reflector modules manufactured from these materials are commonly referred to as stretched-membrane solar collectors.

A concentrating solar collector may be simply defined as a reflector for optically collecting the sun's radiation and concentrating incident radiation at a focal area. The reflector is typically a mirror or a plurality of mirrors supported by a metal-constructed frame. Independently steered solar reflectors are generally referred to as heliostats. Solar radiation is commonly known as sunlight and, generally speaking, concerns electromagnetic radiation and photons emitted by the sun. The focal area, broadly speaking, is a point or region to which the collector reflects all incident solar radiation. Concentrating generally means increasing the intensities of solar radiation to temperatures needed for industrial process heat or thermoelectrical power stations.

To concentrate solar radiation, individual solar collectors are usually employed in an array to point or focus the radiation onto an absorber target. In most cases, the absorber target is an absorber/receiver. The absorber/receiver, which may be a cavity-type, is normally positioned at either an aimpoint or the focal area of the array, as previously suggested, to absorb maximum solar energy flux. Solar energy flux generally means energy flux transmitted from the sun, which is in the form of electromagnetic radiation. The absorbed solar energy flux is usually carried away by a suitable heat transfer fluid to provide electrical or mechanical power, to operate thermomechanical apparatus, or to provide industrial process heat.

The aforesaid trend toward producing lightweight solar collectors is dictated in part by the high manufacturing costs and heavyweight of glass/metal-type reflector panels and reflector supports. The reflector panels and support structures are often fabricated from thick, heavy metal, glass, and composite materials to meet the solar reflectivity and specularity imposed by the heliostat collector performance requirements, as well as the strength and rigidity standards imposed by the heliostat/collector survival requirements. Reflectivity is generally associated with the reflector material and specular variation in the reflection of radiant energy. Specularity is the degree to which beam radiation can be successfully reflected without scattering the light rays impinging on the reflector surface. The finish and flatness of a surface will affect its specularity. For example, silver-glassed mirrors have traditionally provided the highest reflectivity and best specularity. Metal is a favorable material for manufacturing the reflector support because it gives the reflector panel the capacity to withstand environmental loads without warping, bucking, or fracturing, which eventually could lead to failure. Examples of such environmental loads are gravity loads, wind loads, and ice/snow loads.

Unfortunately, the heavy deadweight load of the glass/metal reflectors and the reflector supports frequently produces stresses and deformation that undesirably add to the harmful stresses produced by the environmental loads. Additionally, the aforementioned use of heavy glass, metal, and other structural materials to fabricate the reflectors and their supports is one major reason for their high manufacturing costs.

In addressing the disadvantages associated with glass/metal-type reflector panels by producing lightweight stretched membrane solar collectors which greatly simplify and reduce the weight of the reflectors, a problem has developed in shaping and tensioning the stretched reflector surfaces thereof. For example, it has often been extremely difficult to shape and tension a stretched-membrane-type reflector surface so that it produces an acceptable focal spot at the absorber/receiver cavity with minimal unabsorbed surface reflected solar flux. Also, the absorber/receiver must be sufficiently small to minimize the associated radiant and convection energy losses. Radiant and convection losses concern solar energy that is lost by the absorber/receiver after the solar radiation is absorbed. The concepts of the required focal spot size and the radiant and convection losses become even more significant when it is realized that the characteristics of a stretched membrane reflector surface and a focus provided thereby may be used to reduce radient and connection losses.

A stretched reflector surface will generally have a gravity-induced focal length which is a function of the surface tension and a reflector elevation angle. Normally, increasing the tension of the stretched reflector surface increases the gravity-induced focal length. The ideal focal length is equal to a slant range from the reflector to the absorber/receiver cavity. Hence, each solar collector in the field will have a different focal length and a different associated tension to control the gravity-induced focus. Thus, it is evident that the aforesaid reflector characteristics can be used to enhance collector system performance by reducing the size of the image at the receiver and therefore the amount of energy spillover.

Another problem is that the reflector surfaces of stretched-membrane solar collectors usually have to be tensioned and assembled at the manufacturing facilities rather than at the collector sites. They also usually require skilled workmen to assemble them. Moreover, once the collectors are factory-assembled, their focus or aimpoint is usually not easily adjustable; therefore it can be difficult to produce various concentration ratios to meet specific collector site requirements. Concentration ratios are the ratio of the intensity of solar light impinging on the absorber/receiver to the solar light impinging on the reflector surface. Notably, these ratios may be as small as one for no concentration using a single collector to as high as several thousand using a large field of collectors.

Besides, many factory-assembled collectors which do not provide a means for immediately adjusting the reflector tension during periods of operation at the collector site frequently are incapable of compensating incapable reflector tension variations and reflector deformation because of long-term reflector creep and environmental loads. Reflector creep may be defined as a slow change in reflector tension as a result of prolonged exposure to temperature excursions and environmental loads.

Still another problem related to factory-assembled collectors is that shipping constraints usually limit the size of the reflector module which can be transported to the collector site from the factory. Another problem is that most current membrane solar collectors require fairly sophisticated designs to provide the reflector surfaces with the desired durability and optics.

To cope with the aforesaid problems, the reflector surfaces of some solar collectors have been designed by tensioning a sheet of aluminized Mylar over a plurality of elongated supporting members. The supporting members impart a catenary configuration to the aluminized sheet. A prior art patent relating to such a design is U.S. Pat. Ser. No. 4,173,397. Unfortunately, however, this prior art design as well as others have suffered from one or more shortcomings. For example, this earlier design is unduly complex, comprises a number of component parts, and has a focus that is not easily controllable.

Some prior art designs have stretched a sheet of aluminized Mylar over a top of a hollow cylinder and reduced a pressure therein between to provide a desired surface configuration. An example of this design is disclosed in U.S. Pat. Ser. No. 4,288,146. Unfortunately, this design may develop leaks and changes in the pressure within the cylinder. Such leaks may, in turn, lead to undesirable and irreversible degradation of the collector focus. It will be noted that the use of a vacuum pump to maintain the desired pressure has to some degree been helpful in reducing some aspects of the pressure leakage problem. However, such a pump is an additional cost element and is power consuming. Moreover, such a vacuum system adds complexity to the collector system, requires additional maintenance and reduces system reliability.

Another prior art design somewhat similar to the design of the present invention is taught in U.S. Pat. Ser. No. 4,251,135. Here, a solar reflector having a flexible triangular reflective membrane with three sides thereabout employs a tension cable to place the membrane under tension. This design, however, fails to provide a means for adjustably varying the tension of the assembled reflector panel at the collector site. Thus, this design suffers from the same long-standing problem discussed above in connection with factory-assembled, stretched-membrane collectors that the present cable tensioned membrane solar collector module invention with variable tension control has satisfactorily overcome this problem.

SUMMARY OF THE INVENTION

Against the foregoing background, it is therefore a general object of the present invention to provide a tensioning device for a lightweight stretched-membrane solar collector module which overcomes many of the aforementioned shortcomings and disadvantages of the prior art lightweight solar collectors.

It is a specific object to provide a lightweight stretched membrane-type reflector module which is adequately held in plane and in tension substantially solely through low-cost, simply constructed, fairly lightweight tensioning components.

It is another specific object to provide a lightweight stretched membrane-type reflector module with variable control tensioning which can be used to compensate for reflector surface variations due to reflector creep and environmental loads at the collector site, as well as to produce desired concentration ratios.

The above objects, as well as other objects and advantages, are attained by the present invention, which may be described briefly as a solar collector comprising a membrane member for concentrating sunlight, a plurality of elongated structural members for suspending the membrane member thereon, and a plurality of control members for adjustably tensioning the membrane member and controlling a focus provided by the membrane member. Notably, each control member is disposed at a different corresponding one of the plurality of structural members. The collector also comprises an elongated flexible tensioning member that stretches the membrane member and holds it in tension, and a plurality of sleeve members provide the membrane member with a desired surface contour during the tensioning thereof. The tensioning member is coupled to the structural members such that the tensioning member is adjustably tensioned with the control members. The tensioning member is also coupled to the membrane member through the sleeve members such that the sleeve members uniformly and symmetrically stretch the membrane member upon applying a tension to the tensioning member with the control members.

Additional objects, advantages, and novel features of the present invention will be set forth in part in a detailed description which follows, and in part will become apparent to those skilled in the art upon an examination of the following description or upon practicing the invention. The objects and advantages of the invention may be realized and obtained by means of elements or a combination of elements particularly pointed out in the appended claims.

BRIEF DESCRIPTION OF THE DRAWINGS

The accompanying drawings, which are incorporated in and form a part of the specification, illustrate preferred embodiments of the present invention and together with the description serve to explain the principles of the invention.

In the drawings.

DETAILED DESCRIPTION OF THE PREFERRED EMBODIMENTS

Figure 1:
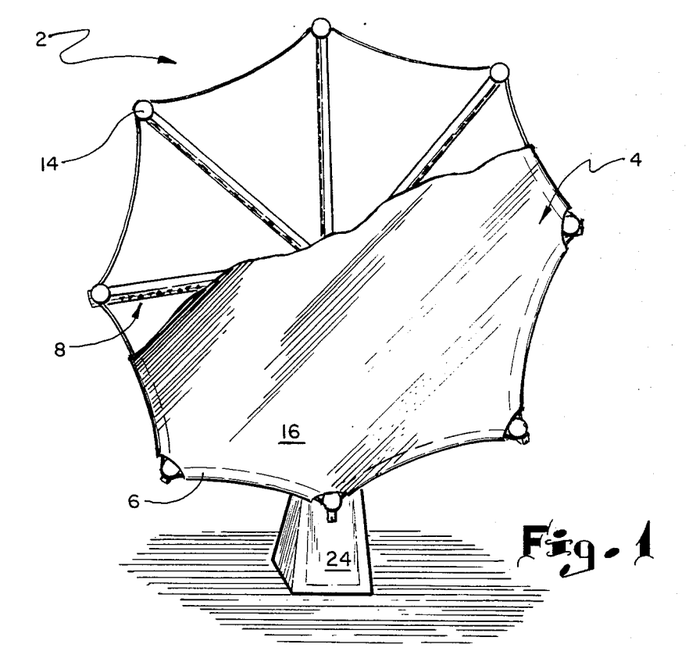
FIG. 1 is a partly broken, perspective, front view of a cable-tensioned membrane solar collector module with variable tension control constructed in accordance with the principles of the invention.
Figure 2:
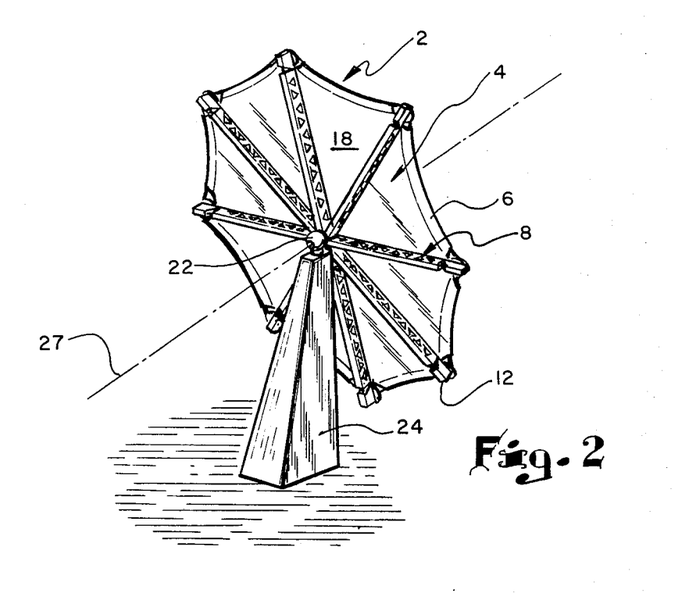
FIG. 2 is a perspective back view of the cable-tensioned membrane solar collector module of FIG. 1.
Figure 3:
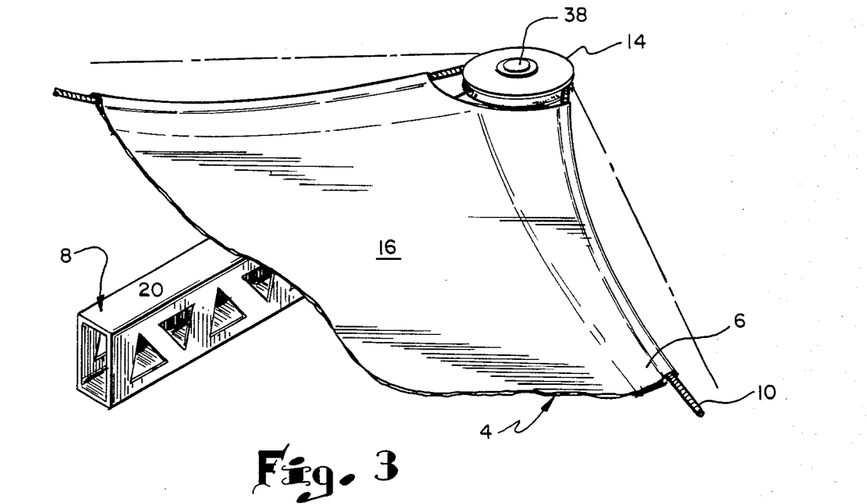
FIG. 3 is a partly broken, enlarged, perspective, detailed view illustrating a relation between a frame member, sleeve members, a membrane member, and a retaining member of the cable-tensioned membrane solar collector module of FIG. 1.

Referring initially to FIGS. 1–3, there is illustrated a preferred form of a cable-tensioned membrane solar collector module 2 with variable tensioning control constructed in accordance with the invention. Generally speaking, the cable-tensioned solar collector module 2 may be employed in numerous applications where a reflector or collector surface is required to retrieve power from solar energy. An example of one such application is a central receiver system which, generally speaking, employs a field of heliostat collectors to concentrate solar radiation into an absorber/receiver to generate fairly large amounts of electrical power or thermal energy for industrial processes. The collector module 2 generally includes a reflector 4, a plurality of sleeve members 6, a reflector support member generally designated by the reference numeral 8, a reflector surface cable-tensioned member 10, a plurality of a variable tensioning control members 12, and a plurality of cable retaining members 14.

Referring initially to the reflector 4, it generally functions as a lightweight stretched-membrane-type reflector surface for optically collecting and concentrating sunlight. In the illustrated form, the reflector 4 comprises a composite membrane member having a closed polygonal shape. The composite member includes an upper filmlike layer 16, which forms a reflector surface, and a lower layer 18 which serves as a substrate for the upper layer 16.

The lower substrate layer 18 is best shown in FIG. 2 and may be formed from any number of fairly thin, lightweight, elastic reflector materials, such as aluminum, steel foils, or high-strength, polymeric foils. Likewise, the reflector surface 16 may be formed from any number of well-known plastics which are capable of meeting the mechanical property requirements and optical performance requirements for satisfactory reflector surface operations. Aluminized polyesters and silvered polycarbonate are examples of such reflector surface materials. Incidentally, it will be appreciated that the reflector surface 16 can be applied to the lower layer 18 with any number of well-known reflector surface forming techniques. Examples of such techniques are direct metallization techniques and surface sheet lamination techniques.

Referring now to the reflector support member 8, the reflector support member 8, broadly speaking, functions to support and suspend thereon the reflector 4. More directly, it also functions to assist the tensioning member 10 in holding the reflector 4 in tension. In the illustrated form, the reflector support member 8 comprises four elongated metal constructed structural members 20. The structural members 20 are connected to a centrally located reflector hub member 22 in a spokelike configuration such that the structural members 20 radiate from the reflector hub member 22, as is most clearly shown in FIGS. 1 and 2.

The reflector hub member 22 is anchored to the ground by a pedestal 24, which is of sufficient strength and rigidity to satisfactorily withstand collector module system overturning moments transferred thereto from the reflector hub member 22. It will be noted that the invention contemplates the reflector hub member 22 and the pedestal 24 to provide mounting provisions for a two-axis steering and tracking or drive assembly. It will be further noted that firstly, the details of the two-axis drive system and the mounting provisions thereof have been omitted from the drawings for the sake of clarity and brevity since they are well known in the heliostat collector art, and secondly, the drive system and its mounting provisions along with the pedestal 24 form no part of the present invention.

Figure 4:
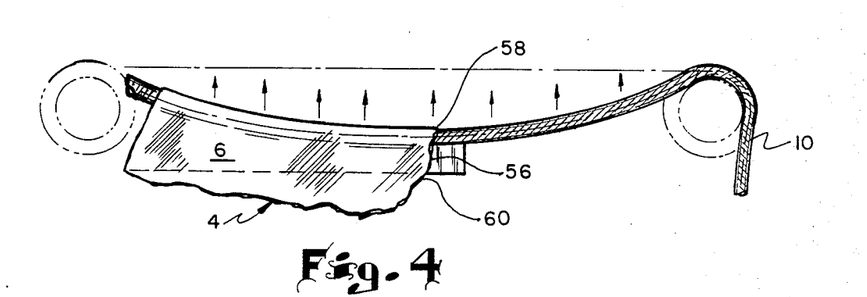
FIG. 4 is a partly broken, enlarged, perspective, detailed view illustrating a relation between a tensioning member and the sleeve member of the cable-tensioned membrane solar collector module of FIG. 1.

Referring now to FIGS. 4 and 5 and again to FIG. 3, the reflector support member 8 is provided with a plurality of metal-constructed variable tensioning control members 12, one control member 12 being located at a different peripheral end portion 26 of each structural member 20. The control members 12 generally function to adjustably or variably tension the tensioning member 10. Each control member 12 also functions to control a gravity-induced focus provided by the reflector 4, as well as to provide a means for fine tension adjustment of the tension in the reflector 4. It will be noted that the tensioning member 10 in response to adjustment of the control members 12 functions to tension the reflector 4, as will be more fully explained hereinafter.

Figure 5:
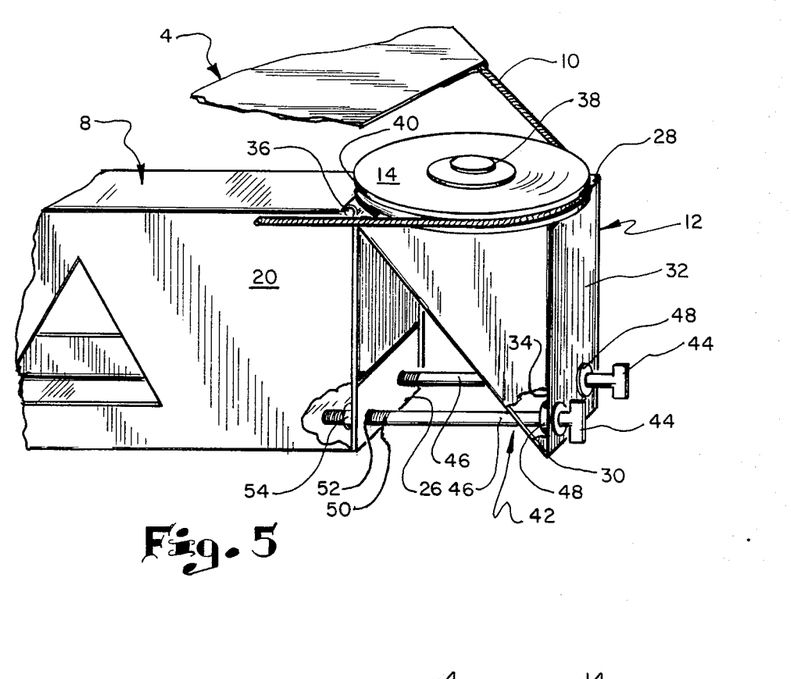
FIG. 5 is a partly broken, enlarged, perspective, detailed, side view illustrating a tensioning control member of the cable-tensioned membrane solar collector module of FIG. 1.

In the particular arrangement illustrated, each control device member 12 is shown in a lowered position for imparting tension to the tensioning member 4 and is pivotally connected to a different, corresponding structural member 20 through a pin member 36. By the connections with pin member 36, control member 12 is enabled to be rotated from a first or raised position to the second, lower position. In the raised position tension is relieved and a shorter focal length is allowed, while in the lowered position tension is increased and longer focal lengths are sustained.

Also, in the particular embodiment illustrated, each control member 12 is provided with a wedgelike shape which defines opposed upper and lower portions 28, and 30, respectively. The wedgelike shape and the manner in which each control member 12 is pivotally connected to its associated structural member 20 allows the control member 12 to form an acute angle with an outer surface of the end portion 26 of the related structural member 20, as is clearly shown in FIG. 5. By this angle, the two surfaces 26, and 30 are, generally speaking, radially spaced from one another to enable each control member 12 to be rotated in a radial direction relative to an imaginary axially extending center line 27, depicted in FIG. 2, which passes through the hub member 22. Stated somewhat differently, each control member 12 is enabled to be pivotally moved toward the associated structural member 20 when tensioning the reflector 4 and to be pivotally moved away from the associated structural member 20 when detensioning the reflector through the aforesaid pin connection.

Figure 6:
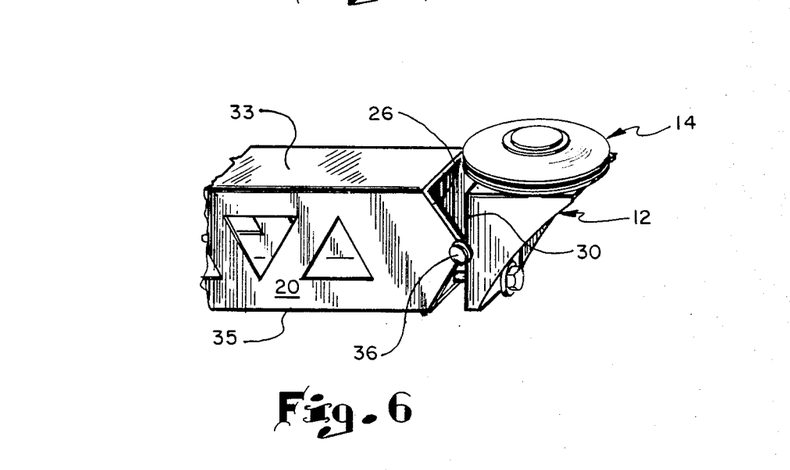
FIG. 6 is a partly broken, enlarged, detailed perspective view illustrating a variant of the pivotal connection between the control members and the structural members.

Although the control members 12 are preferably provided with wedgelike shapes and are preferably connected to the structural members 20 by locating the pin member 36 at upper portions thereof, be it understood that the control members 12 may be formed with other shapes and may be pivotally connected to the control members 20 using other fastening arrangements, as will occur to those skilled in the art. For instance, the outer end regions 26 of the structural members 20 may be configured to form a triangularly shaped fulcrum located approximately intermediate the upper and lower sides 33, and 35, respectively, as is clearly illustrated in FIG. 6. Here, the ends 30 of the control 12 members would be provided with fairly flat surfaces. The control members 12 would be pivotally connected to the structural members 20 by locating the pin members 36 at their fulcrums.

Referring now to the cable-retaining members 14, notably a retaining member 14 is disposed at an outer region of the upper surface 28 of each control member 12, as is clearly illustrated in FIG. 5. Each retaining member 14 serves to secure the tensioning member 10 to the related control member 12, as well as serving to secure the tensioning member 10 to the structural member 20. In the present instance, each retaining member 14 is, generally speaking, in the form of a disk that has an outer circularly shaped rim portion 40. The rim portion 40 defines a recess. The recess is of a size and shape suitable for holding therein the tensioning member 10 with a minimal amount of crimping and for allowing the tensioning member 10 to move freely and easily therein.

The retaining members 14 may be attached to the control members 12 with spot welds or with conventional bolt-type fasteners. However, in the preferred embodiment each retaining member 14 is pivotally connected to one of the associated control members 12 through a pin 38. This pin connection allows the tension imparted to the tensioning member 10 to be uniformly distributed around the circumference of the reflector 4, as will be more fully discussed hereinafter.

Referring again to the control members 12 by way of FIG. 5, attention is now drawn to the fact that the lower portion 30 of each control member 12 is provided with adjusting members. The adjusting members are generally designated by the reference numeral 42, and they serve to impart radially indexing movement to the associated control members 12, as will be more fully discussed hereinafter. Each adjusting member 42 is in the form of two feed screws 44 that are operatively connected between the associated control member 12 and the associated structural member 20.

In this double feed-screw arrangement, a first threadless portion 46 of each feed screw 44 is rotatably secured at the outer end portion of the associated control member 12 with a pair of washer-shaped retaining rings 48, one ring 48 being spot welded to an inner surface 34 of the control member 12, and the other ring 48 being spot welded to its outer surface 32. A second threaded portion 50 of each feed screw 44 threadably engages a mating nut 54 at an aperture 52 of the associated structural member 20. Each nut 54 is welded to the inner surface of the outer end 26 of the structural member 20.

Referring now to the sleeve members 6, and again to FIGS. 2, 3, and 4, the reflector member 4 is shown to include a plurality of sleeve members 6. The sleeve members 6 generally function to couple the reflector 4 to the tensioning member 10 and to bring the reflector 4 to an isotropic, planar tension state, during the tensioning of the reflector 4. By bringing the reflector member 4 to an isotropic, planar state, the sleeve members 6 enable the reflector 4 to be uniformly and symmetrically stretched to a desired level of constant tension.

To accomplish imparting isotropic properties to the reflector membrane 4 during tensioning, each sleeve 6 is provided with a parabolic shape which approximates a catenary. The latter shape may be defined as a gravity-induced curve assumed by a flexible cable of uniform density and cross section hanging freely from two points. More specifically, each sleeve member 6 is in the form of an elongated sheet that has been folded in a manner to define a longitudinally extending slot 56. Each slot 56 for each sleeve member 6 generally functions to seat therein a different corresponding portion of the tensioning member 10, and it is of a size and shape suitable for this purpose. Each slot 56, and thus each sleeve member 6, also includes an upper portion 58 and a lower portion 60, which define a pair of longitudinally extending, transversely spaced peripheral edges.

The upper portion 58 of each sleeve member 6 has a bow or parabolic shape and primarily functions to assist the tensioning member 10 in providing the reflector surface 16 with a certain level of constant tension, whereas the lower portion and the spaced edges 60 thereof function to receive and retain therein between corresponding boundary portions of the reflector 4 through spot welds, bonding, or some other suitable fastening technique. The upper portion 58 also functions to assist the tensioning member 10 in effecting a desired gravity-induced focal length and in substantially preventing deterioration of the collector focus due to wind-induced deflections. For example, upon the sleeve members 6 being attached to the reflector 4, and upon loading the sleeve members 6 with the tensioning member 10, the sleeve members 6 act to uniformly stretch the reflector 4 in opposition to the straightening influence exerted on the upper portions 58 by the loaded tensioning member 10. This loading technique together with the parabolic shape of the sleeve members 6 enables the reflector 4 to be uniformly tensioned and stiffened to a constant magnitude which minimizes deterioration of the collector focus due to high winds and/or weight.

It will be noted that the sleeve members 6 may be formed from any number of well-known polymeric materials, such as polimide, or metallic-type materials, such as steel and aluminum. Preferably, the sleeve members 6 are formed from the same material selected for the lower substrate layer 18 of the membrane reflector member 4.

Referring now to the tensioning member 10, the tensioning member 10 serves to uniformly and symmetrically tension the reflector 4, to hold the reflector 4 in constant tension through the sleeve members 6, and to connect the reflector 4 to the structural members 20, as is clearly shown in FIG. 5. The tensioning member 10 may be fabricated from any number of materials, such as metal cables, high-strength ropes, and single filament lines. Preferably, the tensioning member 10 comprises a high-strength cable.

Upon mounting the reflector 4 to the reflector support member 8, it is obvious that the sleeve members 6 function to couple the reflector 4 to the cable 10 and that the cable 10, in turn, functions to couple the reflector 4 to the structural members 20 through the tensioning control members 12 by way of the retaining members 14.

To accomplish mounting the reflector 4 to the reflector support member 8, the cable 10 is inserted through the slots 56 of the coupled sleeve members 6 and the reflector member 4. As previously mentioned, the sleeve members 6 are coupled to the reflector 4 by equally spacing and fastening them around the boundary of the reflector 4 via the slot edges 60. Thereafter, the reflector 4 is suspended at the reflector support member 8 such that each sleeve member 6 is disposed between two different adjacent structural members 20, and the free segments of the cable 10 are within corresponding rim portions 40 of the retaining members 14. From the aforesaid, it is also obvious that a plurality of separate, fairly large-size reflectors 4 can be easily mass mounted to associated support members 8 at a collector site, rather than at a factory.

To accomplish tensioning the reflector 4 with the cable 10, each set of screw feeds 44 are initially sequentially rotated a desired number of turns in a clockwise direction. Such rotation threadably advances the feed screws 44 at the nuts 54 and imparts radially inward movement thereto. This radial movement causes the affected control member 12 to pivotally move radially inward and downward at the pin member 36 while carrying its mounted retaining member 14 with it. The downward and radial inward movement of both the control member 12 and its retaining member 14 serves to subject the cable 10 to a tension force.

In response to this tension force, the upper bow-shaped portions 58 of the sleeve slots 56, and thus the sleeve members 6 themselves, attempt to straighten. As the sleeve members 6 straighten, they subject the edges of the attached reflector 4 to a pulling force which acts to uniformly and symmetrically tension the reflector 4.

From the aforesaid, it will be noted that additional rotation of the feed screws 44 causes the tension in the reflector 4 to be incrementally increased. More particularly stated, increasing the tension in the cable 10 through the control members 12 reciprocally increases the amount at which the upper curved portions 58 of the slots 56 are straightened and, thus, also reciprocally increases the tension in the reflector member 4. The reflector 4 is fully tensioned when the control members 12 are rotated such that the inner surface regions thereof abuttingly engage the outer surfaces of the structural member ends 26 or when the feed screws 44 are fully advanced.

It will also be noted that the ability of the tensioning member 10 to slide freely within the rims 40 of the retaining members 14 in conjunction with the ability of any one or more of the affected retaining members 14 to rotate, upon adjusting selected control members 12, allows the tension applied to the reflector 4 through the tensioning member 10 and the sleeve members 6 to be uniformly distributed around the boundary regions of the reflector 4. These abilities also enable the applied tension to remain uniformly distributed around the boundaries regions thereafter.

It will now be appreciated that during the tensioning of the reflector member 4, the amount at which the slots 56 are straightened, in part, determines the ultimate contour and the degree of tension and stiffness that are imparted to the reflector surface 16. Additionally, this slot straightening and tensioning characteristic of the present invention significantly contributes to controlling the gravity-induced focusing of the collector 2 and to protecting the collector 2 from being adversely affected by high winds. For example, increasing the tension as aforesaid tends to flatten the contour or optical reflector surface 16 of the reflector 4, and changing the surface tension and surface contour causes the gravity-induced focal point to also change. Moreover, the reflector 4 can be tensioned and thereby stiffened at levels sufficient to substantially prevent wind-induced reflector surface deflections. Here, it is contemplated that the magnitude of tension imparted to the reflector 4 will be optimized to provide sufficient stiffness to minimize deterioration of the reflector focus due to environmental loads, as well as to produce satisfactory solar flux concentrations at the receiver.

Having explained the details of tensioning the reflector 4, it will be evident that rotating the feed screws 44 in a counter-clockwise direction results in initially backing the feed screws 44 from the nuts 54. The latter action of the feed screws 44 causes the control members 12 to pivot about the pin members 36 in an upward and radially outward direction relative to the structural member ends 26. Such upward movement releases the tension in the cable 10, as well as in the coupled sleeves 6 and the reflector member 4. Consequently, the reflector 4 is detensioned in the aforesaid manner and returned to its original nontensioned state.

Attention is now drawn to the fact that the cable-tensioned membrane solar collector module 2 of the present invention has several advantages over earlier somewhat similar collector types in that: the reflector panel member 4 uses mostly inexpensive, readily available materials and components which can be easily and cheaply manufactured; the reflector member 4 can be easily assembled, adjustably tensioned, and disassembled at the collector site; and the sleeve members 6, cable 10, and control members 12 provide the collector 2 with variable control tensioning which can be used to compensate for tension reflector variations due to reflector creep and environmental loads, as well as to produce desired concentration ratios.

Figure 8:
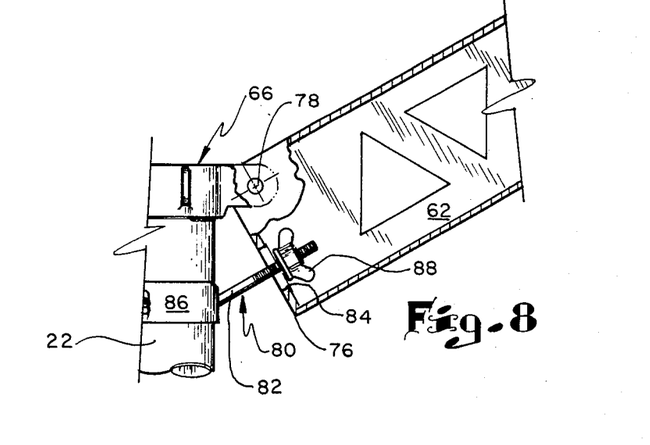
FIG. 8 is a partly broken, enlarged, detailed, side view illustrating a connection between a reflector support member and a hub member of the cable-tensioned membrane solar collector module of FIG. 7.
Figure 9:
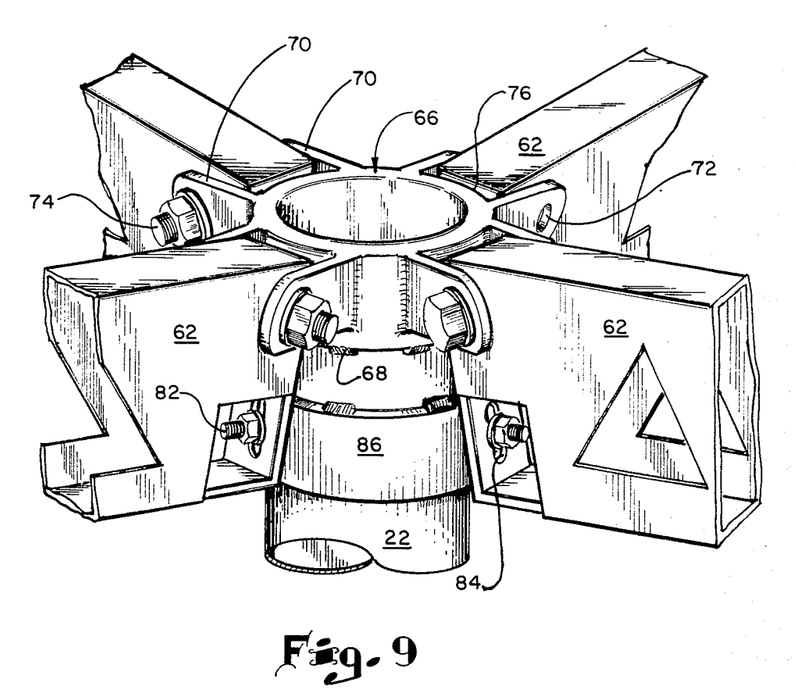
FIG. 9 is a partly broken, enlarged, perspective, detailed view illustrating a bracket and pin assembly for pivotally connecting the structural members to the hub member of the cable-tensioned membrane solar collector module of FIG. 7.

In keeping with the invention, various changes and modifications to particularly disclosed embodiments will be apparent to those skilled in the art and eventually may be made without departing from the spirit and scope of the invention. By way of example, there is illustrated in FIGS. 7–9 a variant of the embodiment of FIG. 1 wherein the structural support members, which in this instance are denoted by the reference character 62, are employed to assist the tensioning member 10 in holding the reflector 4 in a state of plane tension.

It will be noted that the reflector member 4, the sleeve members 6, the tensioning member 10, and the retaining members 14 are connected to one another and to the support members 62 in substantially the same manner as that described for the embodiment of FIG. 1. The only difference in the manner in which the aforesaid components of the embodiments of FIG. 1 and FIG. 2 are connected is that the retaining members 14 are directly connected to the outer end portions of the structural members 62, as is clearly shown in FIG. 7.

Figure 7:
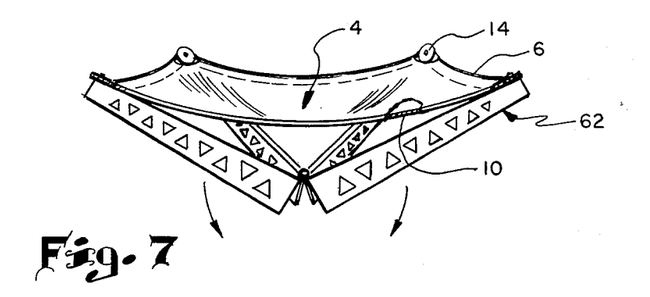
FIG. 7 is a perspective front view illustrating a variant of the variable tensioning control components and pivoting components of the cable-tensioned membrane solar collector module of FIG. 1.

To enable initial attachment and tensioning of the reflector 4 of FIG. 7, the reflector support members 62, which are shown in their raised or nontension position, are pivotally mounted at a first upper portion of the hub member 22 by way of a collar and pin arrangement 66, which arrangement is secured thereto by conventional means such as spot welds 68. The collar 66 is provided with cleaved brackets 70, which have apertures 72 for receiving therein the pins 74, and which are of a size and shape to receive therein between mating peripheral end portions 76 of the structural members 62. The structural end portions 76 are provided with apertures 78 for receiving therein the pins 74 on which the structural members 62 are enabled to pivotally swing.

The variable tension control member, which is generally designated by the reference numeral 80, comprises a plurality of studs 82 circumferentially spaced about a lower portion of the hub member 22 so as to project within complementary elongated through slots 84 of the structural end portions 76. The studs 82 are secured to the hub 22 with a collar 86. End portions of the studs 82 are threaded and are fitted with stud heads in the form of wing nuts 88. The slots 84 are of a size and shape suitable for allowing vertical movement of the structural members 62 during tensioning or detensioning.

When applying and tensioning the reflector member 4, the structural members 62 are pivotally lowered from their raised or near vertical position until a desired amount of tension in the reflector member 4 is acquired. Lowering the structural members 62 is accomplished by threadably advancing the stud heads 88. As the stud heads 88 are advanced, the structural members 62 will be caused to swing downward in a clockwise direction so as to place the reflector member 4 under a desired tension. By referring to FIGS. 7 and 8, it will be apparent that the reflector member 4 is completely tensioned when the ends 76 of the structural members 62 abuttingly engage the hub 22.

Upon threadably backing off the stud heads 88, the structural members 62 can be pivoted in a counterclockwise direction so as to allow the structural members 62 to be raised from the lower or near horizontal position to the vertical position. Such counterclockwise movement of the structural members 62 enables the reflector member 4 to be detensioned. Incidentally, it will be appreciated that the initial tension in the tensioning member 10 is of sufficient magnitude to keep the support members 62 raised when the support members 62 are in a nontensioned position and to assist in swinging the members 62 from the horizontal position to the raised position when the reflector 4 is being detensioned.

The present examples and embodiments, therefore, are to be considered in all respects illustrative and restrictive, and the invention is not to be limited to the details given herein but may be modified with the scope of the appended claims.

The embodiments of the invention in which an exclusive property or privilege is claimed are defined as follows:

1. A solar collector comprising:
   (a) a membrane member for concentrating sunlight;
   (b) a plurality of elongated structural members for suspending the membrane member thereon;
   (c) a plurality of control members for adjusting a tension in said membrane member and for controlling a focus provided by said membrane member, each one of said control members being disposed at a different corresponding one of said plurality of stuctural members;
   (d) an elongated flexible tensioning member for tensioning said membrane member and holding said membrane member in tension; said tensioning member being coupled to said plurality of structural members, said tensioning member being adjustably tensioned with said control members; and
   (e) a plurality of sleeve members for providing said membrane member with a desired surface contour during said tensioning of said membrane member, said plurality of sleeve members coupling said tensioning member to said membrane member such that said plurality of sleeve members uniformly and symmetrically stretch said membrane member in response to applying tension to said tensioning member with said control members.

2. A solar collector as recited in claim 1, further comprising a plurality of retaining members, each one of said plurality of retaining members being disposed at a different corresponding one of said structural members, and wherein spaced portions of said tensioning member are secured to said retaining members to effect coupling said membrane member to said structural members.

3. A solar collector as recited in claim 1, further comprising a plurality of retaining members, each one of said plurality of retaining members being disposed at a different corresponding one of said plurality of control members, and wherein spaced portions of said tensioning member are secured to said retaining members to effect coupling said membrane member to said structural members.

4. A solar collector as recited in claim 1, wherein said plurality of sleeve members comprise elongated sheet members, each one of said sheet members being folded in a manner to define a longitudinally extending contoured slot, each said slot being adapted for seating therein a different corresponding portion of said tensioning member, each said sleeve member including a pair of longitudinally extending transversely spaced peripheral edges for positively securing therein between corresponding boundary portions of said membrane member, and wherein tensioning said tensioning member causes said tensioning member to straighten said contoured portions defined by said slots, said straightening of said contoured portions causing said sleeve members to subject said membrane member to stretching forces, said stretching forces causing said membrane member to be said uniformly and symmetrically stretched in a manner to provide said membrane member with said desired surface contour, and wherein an ultimate shape of said surface contour is controlled by an amount at which said contoured slot portions are straightened.

5. A solar collector as recited in claim 1, wherein said plurality of structural members comprise at least two substantially rigid elongated frame members, said at least two frame members being joined at common midpoints so as to extend in a radially outward direction with respect to said midpoints.

6. A solar collector as recited in claim 1, wherein said elongated flexible tensioning means comprises a rope.

7. A solar collector as recited in claim 1, wherein said elongated flexible tensioning means comprises a cable.

8. A solar collector as recited in claim 1, wherein said membrane member comprises a planerly-shaped sheet of a reflector material.

9. A solar collector as recited in claim 2, wherein said control members are secured to said structural members in a manner to move in first and second directions relative to said structural members, said control members enabling said membrane member to be tensioned upon being moved in the first one of said two directions, and said control members enabling a tension of said membrane member to be reduced upon being moved in the second one of said two directions.

10. A solar collector as recited in claim 9, wherein moving said control members in said first or second direction to effect tensioning of said membrane member causes said tensioning member to subject said membrane member to stretching forces through said sleeve members.

11. A solar collector as recited in claim 9, wherein said control members move in first and second radial directions relative to an imaginary axially extending center line defined by said structural members.

12. A solar collector as recited in claim 5, wherein each one of said plurality of control members is movably attached to a different corresponding peripheral end portion of said frame members, and wherein movement of said control members relative to said peripheral end portions of said frame members enables said tension in said membrane member to be adjusted.

13. A solar collector as recited in claim 12, wherein said frame members comprise metal frames.

* * * * *